(12) United States Patent
Wei et al.

(10) Patent No.: US 8,297,872 B2
(45) Date of Patent: Oct. 30, 2012

(54) FASTENING DEVICE AND ARTICLE ASSEMBLY HAVING THE SAME

(75) Inventors: Ren-Jing Wei, New Taipei (TW);
Cheng-Hsiang Chuang, New Taipei (TW)

(73) Assignee: Wistron Corporation, New Taipei (TW)

( * ) Notice: Subject to any disclaimer, the term of this patent is extended or adjusted under 35 U.S.C. 154(b) by 92 days.

(21) Appl. No.: 13/052,210

(22) Filed: Mar. 21, 2011

(65) Prior Publication Data

US 2011/0314644 A1    Dec. 29, 2011

(30) Foreign Application Priority Data

Jun. 25, 2010    (TW) ............................... 99120805 A (51) Int. Cl.
*B25G 3/18* (2006.01)
*F16B 21/00* (2006.01)
(52) U.S. Cl. ...................... 403/330; 403/321
(58) Field of Classification Search .................. 403/167, 403/168, 289, 321, 322.1, 327, 330, 360, 403/381; 24/629, 643, 648; 292/11–13, 292/44, 45, 54, 80, 81, 87, 91, 95, 96, 99, 292/101, 121, 122, 128, 194, 195, 198, 216, 292/219, 220; 439/66, 527, 540.1, 541.5, 439/701, 717
See application file for complete search history.

(56) References Cited

U.S. PATENT DOCUMENTS

| | | | | |
|---|---|---|---|---|
| 3,109,677 A | * | 11/1963 | Hoover, Sr | 294/110.1 |
| 3,912,319 A | * | 10/1975 | Hamilton | 294/66.1 |
| 5,312,456 A | * | 5/1994 | Reed et al. | 411/456 |
| 5,373,104 A | * | 12/1994 | Brauer | 174/562 |
| 5,788,347 A | * | 8/1998 | Rabinovitz | 312/111 |
| 6,142,358 A | * | 11/2000 | Cohn et al. | 228/44.7 |
| 6,398,594 B1 | * | 6/2002 | Bonilla et al. | 439/731 |
| 6,733,304 B1 | * | 5/2004 | Liao | 439/66 |
| 7,530,779 B2 | * | 5/2009 | Holloway et al. | 414/686 |
| 2005/0085129 A1 | * | 4/2005 | Chiou et al. | 439/607 |
| 2007/0066150 A1 | * | 3/2007 | Le et al. | 439/819 |

* cited by examiner

Primary Examiner — Michael P Ferguson
Assistant Examiner — Nahid Amiri
(74) Attorney, Agent, or Firm — Nixon & Vanderhye P.C.

(57) ABSTRACT

A fastening device includes a lower engaging hook adapted to be provided on a first article and including a push portion, and at least one first hook portion spaced apart from and disposed below the push portion. Fixing plates are adapted to be provided on a second article disposed above the first article. At least one upper engaging hook is connected pivotally to and disposed between the fixing plates, and includes first and second arms formed as an inverted L-shaped configuration. The first arm extends downwardly from the second arm, and has a second hook portion to engage detachably the first hook portion. The second arm is engageable with the push portion. The upper engaging hook is pivotal to move the second hook portion to engage and move away from the first hook portion when the push portion engages and disengages from the second arm, respectively.

13 Claims, 9 Drawing Sheets

FASTENING DEVICE AND ARTICLE ASSEMBLY HAVING THE SAME

CROSS-REFERENCE TO RELATED APPLICATION

This application claims priority of Taiwanese Application No. 099120805, filed on Jun. 25, 2010.

BACKGROUND OF THE INVENTION

1. Field of the Invention

This invention relates to a fastening device, and more particularly to a fastening device that can facilitate quick assembly and disassembly without the use of screws and an article assembly having the same.

2. Description of the Related Art

Figure 1:
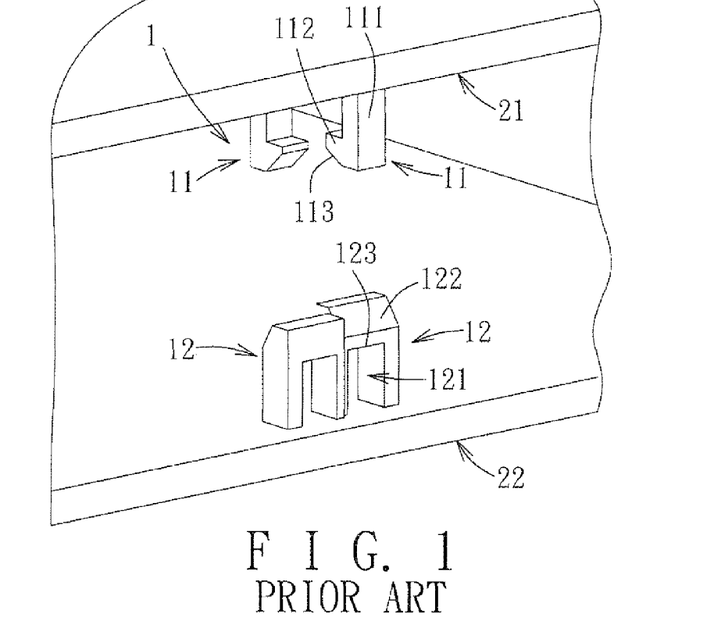
FIG. 1 is a fragmentary perspective view of two casing bodies incorporating a conventional fastening device.
Figure 2:
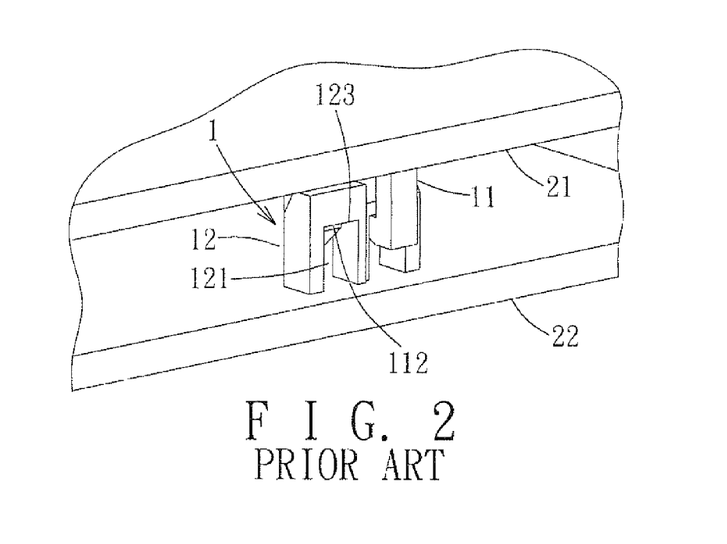
FIG. 2 is a view similar to FIG. 2, but illustrating the two casing bodies in an assembled state.

Referring to FIGS. 1 and 2, a conventional fastening device 1, as disclosed in Taiwanese Patent No. M288756, is used to interconnect first and second casing bodies 21, 22. The fastening device 1 includes left and right engaging hooks 11 provided on the first casing body 21 and disposed opposite to each other, and left and right engaging components 12 provided on the second casing body 22 and disposed opposite to each other. Each engaging hook 11 has an arm portion 111 connected to the first casing body 21, and a hook portion 112 provided on a bottom end of the arm portion 111. Each engaging component 12 has an engaging groove 121 engageable with the hook portion 112 of a respective engaging hook 11.

To interconnect the first and second casing bodies 21, 22, each engaging hook 11 is first brought in alignment with the respective engaging component 12, and is then pressed downward. When an inclined face 113 of the hook portion 112 abuts against an inclined face 122 of the engaging component 12, the hook portion 112 and the arm portion 111 are pushed outward. When the hook portion 112 reaches the engaging groove 121, through the restoring force of the arm portion 111, the hook portion 112 can be retained in the engaging groove 121, and abuts against a groove wall 123. At this time, the first casing body 21 is connected to the second casing body 22.

Since the arm portion 111 of the engaging hook 11 is usually fixed to the first casing body 21, if force applied during assembly or disassembly is improper, the arm portion 111 may easily break. Therefore, the area of improvement that the present invention focuses on is that related to realizing a structural design of a fastening device that can facilitate assembly and disassembly of two casing bodies and that can prevent breakage of engaging hooks.

SUMMARY OF THE INVENTION

A main object of the present invention is to provide a fastening device that can facilitate quick assembly and disassembly of first and second articles and that can prevent breakage of engaging hooks.

Another object of the present invention is to provide an article assembly having a fastening device that can facilitate quick assembly and disassembly of first and second articles and that can prevent breakage of engaging hooks.

The purpose of the present invention and the solution to the conventional technical problems are achieved through employment of the below technical means. According to one aspect of disclosure of the present invention, a fastening device comprises a lower engaging hook, at least one pair of spaced-apart fixing plates, and at least one upper engaging hook. The lower engaging hook is adapted to be provided on a first article, and includes a push portion, and at least one first hook portion spaced apart from and disposed below the push portion. The fixing plates are adapted to be provided on a second article disposed above the first article. The upper engaging hook is connected pivotally to and disposed between the fixing plates, and includes first and second arms formed as an inverted L-shaped configuration. The first arm extends downwardly from the second arm, and has a second hook portion to engage detachably the first hook portion. The second arm is engageable with the push portion. The upper engaging hook is pivotal to move the second hook portion to engage the first hook portion when the push portion engages and pushes upward the second arm, and is pivotal to move the second hook portion away from the first hook portion when the push portion disengages from the second arm.

According to another aspect of this invention, an article assembly comprises a first article, a second article, a lower engaging hook, at least one pair of spaced-apart fixing plates, and at least one upper engaging hook. The lower engaging hook is provided on the first article, and includes a push portion, and at least one first hook portion spaced apart from and disposed below the push portion. The fixing plates are provided on the second article which is disposed above the first article. The upper engaging hook is connected pivotally to and disposed between the fixing plates, and includes first and second arms formed as an inverted L-shaped configuration. The first arm extends downwardly from the second arm, and has a second hook portion to engage detachably the first hook portion. The second arm is engageable with the push portion. The upper engaging hook is pivotal to move the second hook portion to engage the first hook portion when the push portion engages and pushes upward the second arm, and is pivotal to move the second hook portion away from the first hook portion when the push portion disengages from the second arm.

Through the aforesaid technical means, the advantages and effectiveness of the article assembly having the fastening device according to the present invention reside in the fact that through the configuration of the fastening device, the second article can be quickly assembled to or disassembled from the first article, thereby enhancing use of the present invention. Further, during assembly of the second article, the first hook portion of the lower engaging hook can push outward the second hook portion of the upper engaging hook to urge the same to pivot, thereby preventing breakage of the upper engaging hook. When the push portion pushes upward the second arm, the second hook portion is brought to its original position, and engages the first hook portion. During disassembly of the second article, the push portion applies a force to the second engaging hook to disengage the second hook portion from the first hook portion, so that the first hook portion can be easily moved away from the second hook portion.

BRIEF DESCRIPTION OF THE DRAWINGS

Other features and advantages of the present invention will become apparent in the following detailed description of the embodiment of the invention, with reference to the accompanying drawings, in which.

DETAILED DESCRIPTION OF THE EMBODIMENT

The above-mentioned and other technical contents, features, and effects of this invention will be clearly presented from the following detailed description of the embodiment in coordination with the reference drawings. Through description of the concrete implementation method, the technical means employed and the effectiveness to achieve the predetermined purposes of the present invention will be thoroughly and concretely understood. However, the enclosed drawings are used for reference and description only, and are not used for limiting the present invention.

Figure 3:
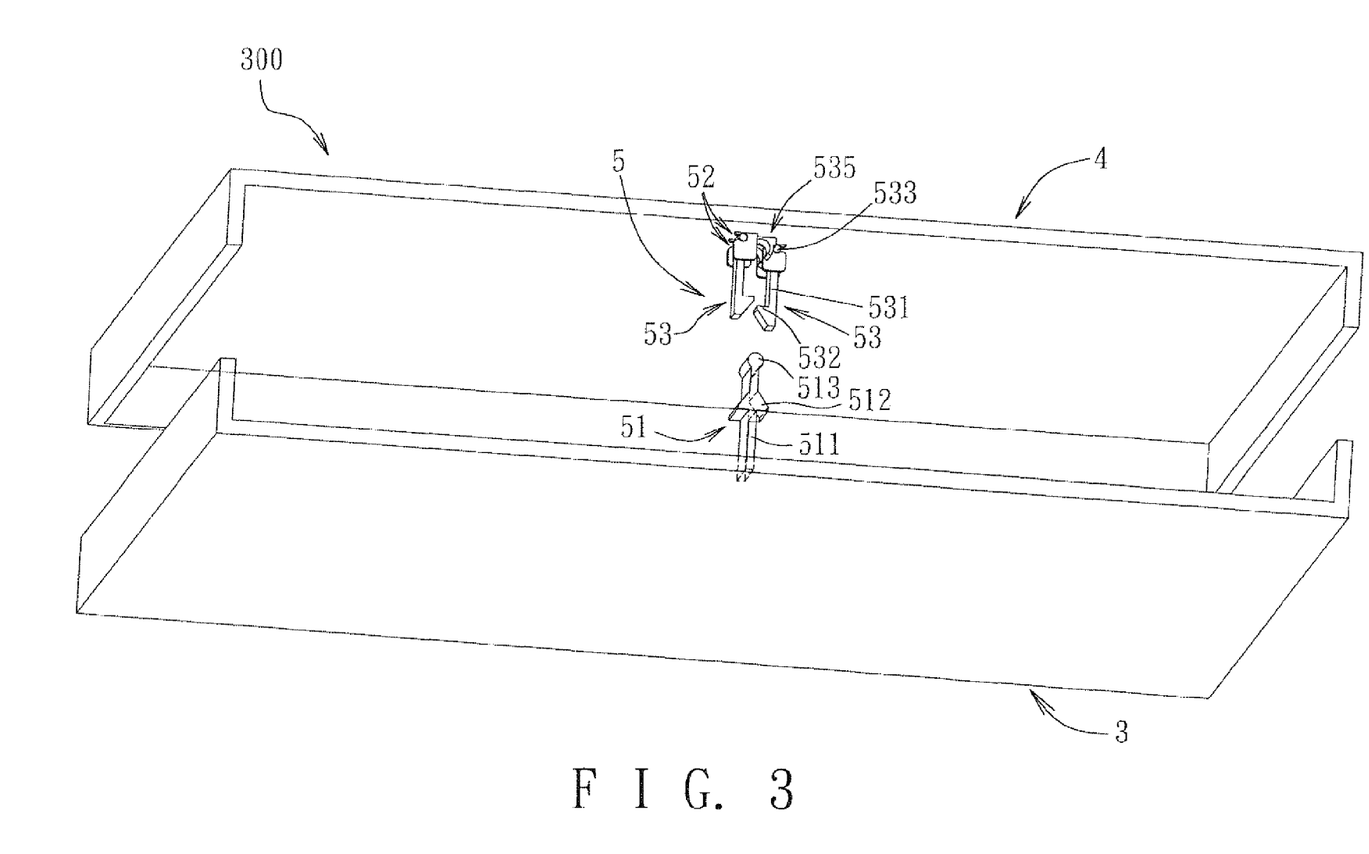
FIG. 3 is a partly exploded perspective view of an article assembly according to the embodiment of the present invention.
Figure 4:
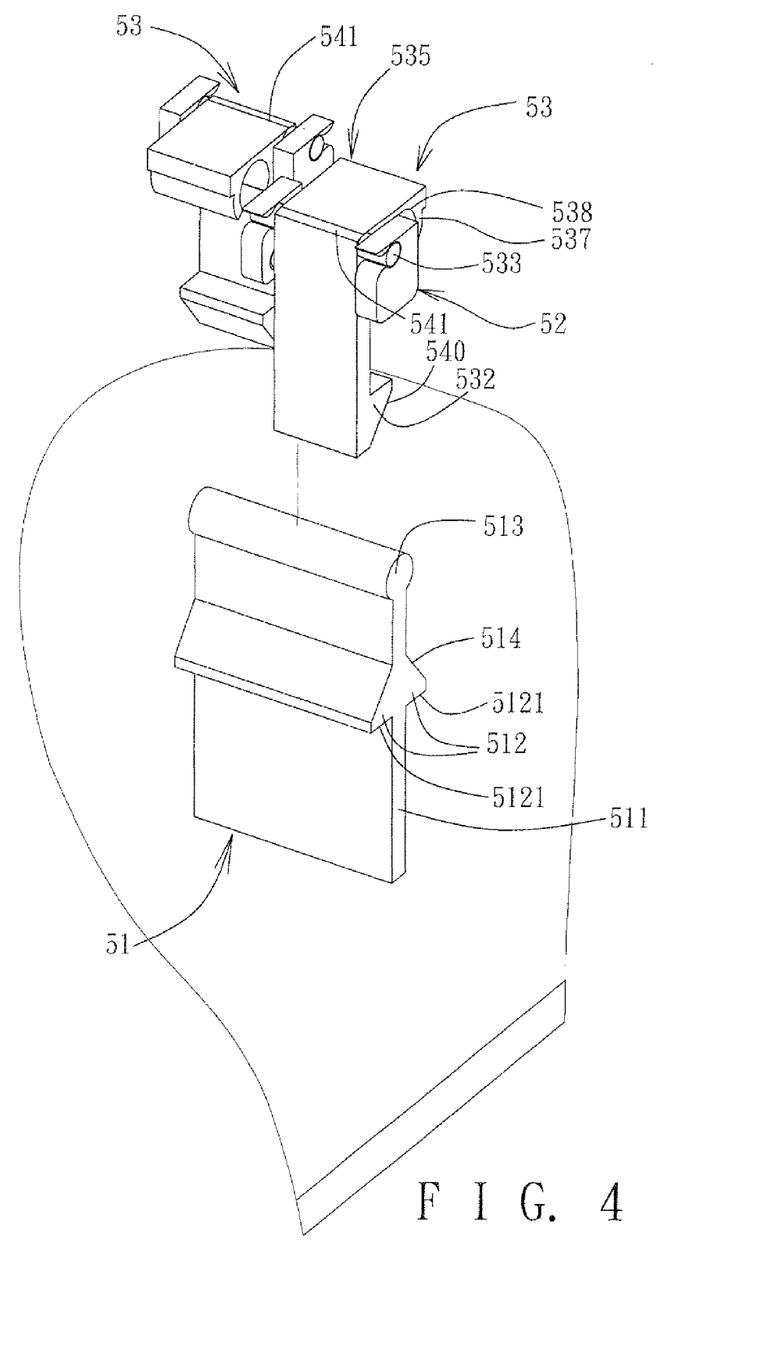
FIG. 4 is a fragmentary enlarged exploded perspective view of the embodiment, but without a second article.
Figure 5:
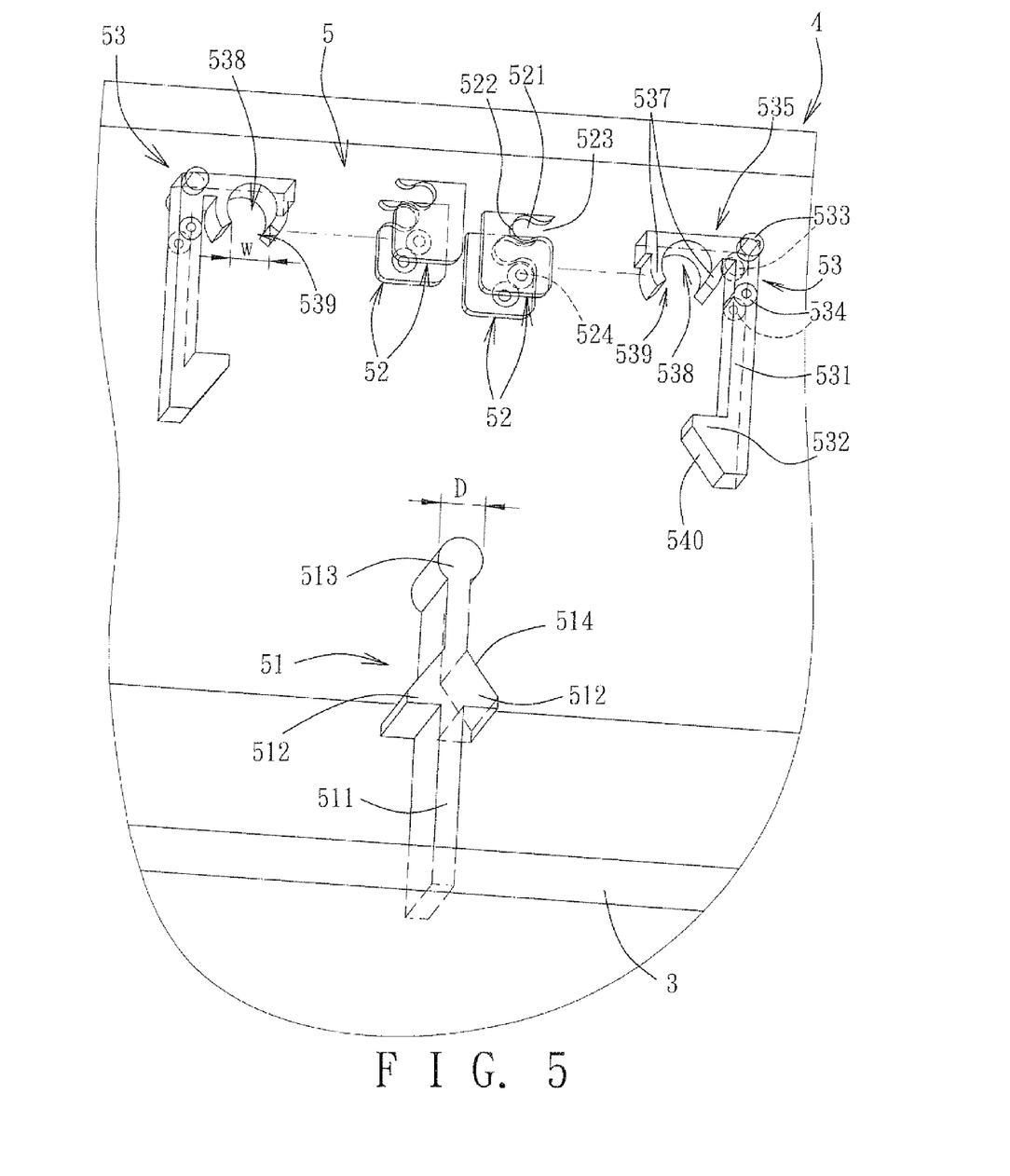
FIG. 5 is a fragmentary exploded perspective view of the embodiment.

Referring to FIGS. 3 to 5, an article assembly 300 according to the embodiment of the present invention is shown to comprise a first article 3, a second article 4, and a fastening device 5. In this embodiment, the article assembly 300 is exemplified as a mainframe housing of a notebook computer, wherein the first article 3 is a lower housing portion, and the second article 4 is an upper housing portion covering the lower housing portion. It should be noted that, in an alternative embodiment, the article assembly 300 may be a housing of a tablet computer, a personal digital assistant (PDA), or a cellular phone. Any product having two articles that require detachable connection may employ the fastening device 5 of the present invention.

The fastening device 5 may include a lower engaging hook 51, at least one pair of spaced-apart fixing plates 52, and at least one upper engaging hook 53. In this embodiment, the lower engaging hook 51 is provided on the first article 3, and includes a push portion 513, and at least one first hook portion 512 spaced apart from and disposed below the push portion 513. The lower engaging hook 51 has an elongate body with top and bottom ends. The top end is used as the push portion 513. The first hook portion 512 projects transversely from the elongate body between the top and bottom ends, and has a transversely extending lower engaging face 5121. The first hook portion 512 is tapered upwardly from the lower engaging face 5121. The fixing plates 52 are provided on the second article 4 which is disposed above the first article 3, and are spaced apart in a front-rear direction. Each fixing plate 52 includes a pivot groove 521. The upper engaging hook 53 is connected pivotally to and disposed between the fixing plates 52, and includes first and second arms 531, 535 formed as an inverted L-shaped configuration. The first arm 531 extends downwardly from the second arm 535, and has a second hook portion 532 to engage detachably the lower engaging face 5121 of the first hook portion 512. The second arm 535 is engageable with the push portion 513. When the lower and upper engaging hooks 51, 53 move close to and abut against each other, the first hook portion 512 pushes the second hook portion 532 to pivot outward.

In this embodiment, two pairs of the fixing plates 52 and two upper engaging hooks 53 are provided. The two pairs of the fixing plates 52 are connected integrally to and are arranged in stagger on the second article 4. The upper engaging hooks 53 are connected respectively and pivotally to the pairs of the fixing plates 52. The inverted L-shaped configurations of the upper engaging hooks 53 lie substantially in different parallel planes. The second arms 535 of the upper engaging hooks 53 extend from the respective first arms 531 in opposite directions. Each upper engaging hook 53 is made of a plastic material, and further includes two resilient clamp members 537 projecting downwardly from the second arm 535 and cooperatively defining a clamping groove 538 to receive and engage releasably the push portion 513, two opposite pivot pins 533 provided at a junction between the first and second arms 531, 535 and journalled respectively to the pivot grooves 521 of the fixing plates 52, and a corner formed at the junction and having an outer slanting face 541 (see FIG. 4). The pivot groove 521 of each fixing plate 52 has a groove opening 5211 (see FIGS. 5 and 6) facing toward one of the pivot pins 533 to guide the same into the pivot groove 521. Through such configuration, each upper engaging hook 53 can pivot relative to the corresponding pair of the fixing plates 52 about the pivot pins 533. Each of the clamping groove 538 and the push portion 513 has a round shape in cross section. The clamping groove 538 has a downward opening 539 with a width (W) smaller than a width (D) of the push portion 513.

The lower engaging hook 51 includes two first hook portions 512 that are spaced apart from and disposed below the push portion 513 and that project transversely and oppositely from the elongate body between the top and bottom ends thereof. The first hook portions 512 have lower engaging faces 5121 to engage the second hook portions 532 of the upper engaging hooks 53, respectively. The first hook portions 512 are tapered upwardly and toward each other above the lower engaging faces 5121.

Figure 6:
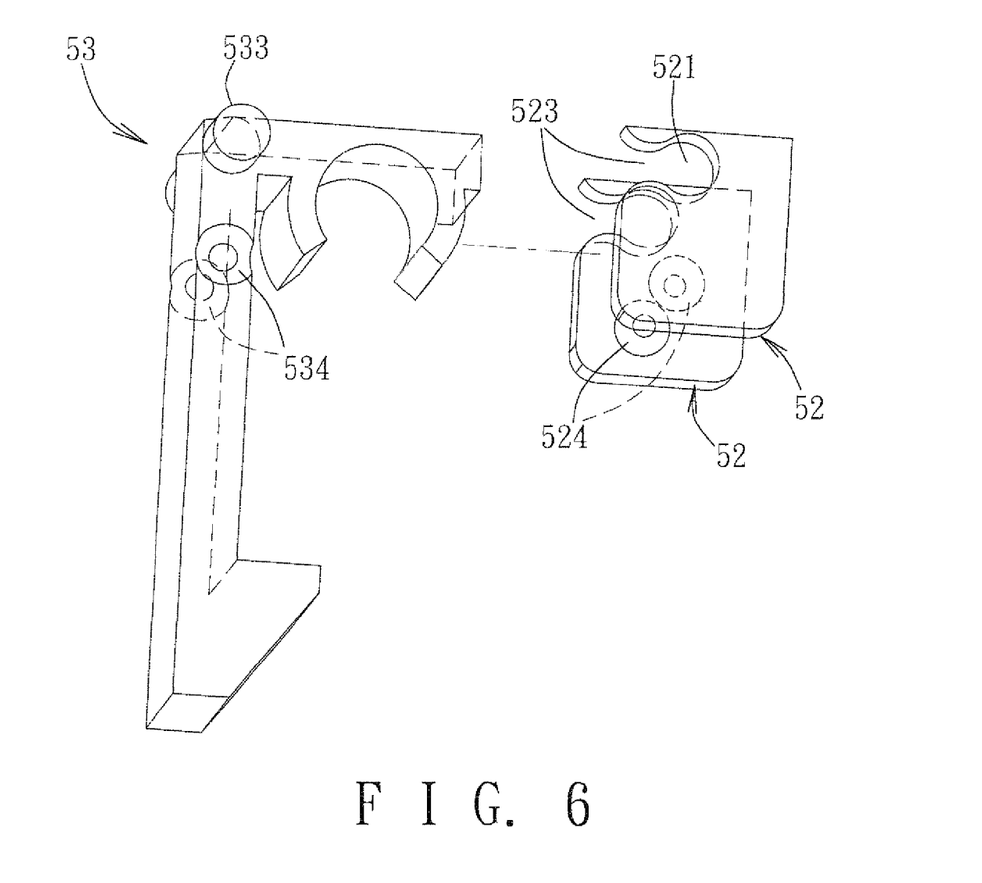
FIG. 6 is an enlarged perspective view of two fixing plates and an upper engaging hook.

Each fixing plate 52 further includes a first positioning portion 524 formed in an inner face thereof below the pivot groove 521. Each upper engaging hook 53 further includes two second positioning portions 534 projecting respectively on two opposite lateral faces of the first arm 531 below the pivot pins 533. In this embodiment, the first positioning portion 524 is configured as a rounded recess, and the second positioning portion 534 is configured as a rounded projection engaged detachably to the rounded recess. Through engagement of the rounded projection with the rounded recess, the first arm 531 of each upper engaging hook 53 can be positioned vertically to prevent separation of the second hook portion 532 from the respective first hook portion 512 when the first and second articles 3, 4 are inter-engaged. Alternatively, as shown in FIG. 6, the first positioning portion 524 may be configured as a rounded projection, and the second positioning portion 534 may be configured as a rounded recess.

Through the configurations of the push portion 513, the resilient clamp members 537, and the clamping groove 538, during assembly or disassembly of the first and second articles 3, 4, the push portion 513 can gradually push apart the resilient clamp members 537, so that the push portion 513 can smoothly engage or disengage the clamping groove 538 via the opening 539. Thus, the resilient clamp members 537 can be prevented from bearing excessive force which can cause its breakage. The width (W) of the opening 539 is smaller than the width (D) of the push portion 513, so that the push portion 513 can be stably engaged to and will not be easily removed from the clamping groove 538 via the opening 539 during assembly.

Figure 7:
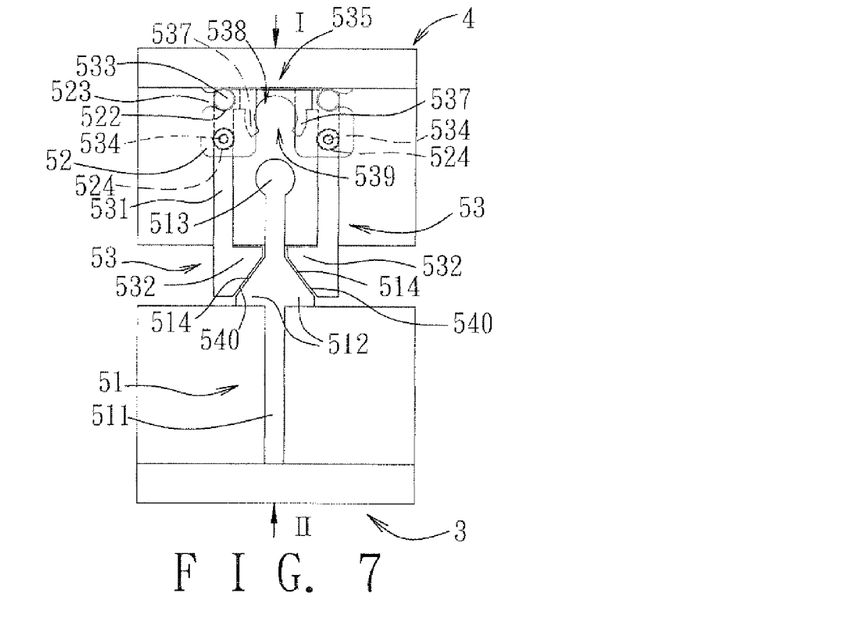
FIG. 7 is a schematic view of the embodiment, illustrating a push portion of a lower engaging hook passing through two upper engaging hooks.
Figure 8:
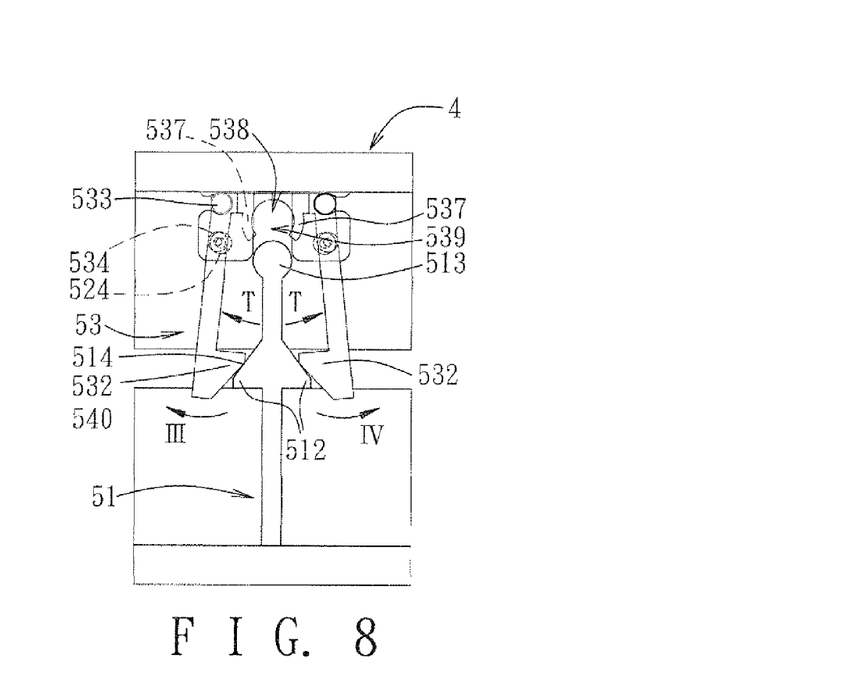
FIG. 8 is a view similar to FIG. 7, but illustrating first hook portions respectively pushing outward two second hook portions and urging the same to pivot.

With reference to FIGS. 7 and 8, if it is desired to fix the second article 4 to the first article 3, the push portion 513 is first brought in alignment with the second hook portions 532, after which the second article 4 is pressed downward along an arrow (I) toward the first article 3, or the first article 3 is pushed upward along an arrow (II) toward the second article 4, or the first and second articles 3,4 are pressed toward each other along the respective arrows (II, I). Since each first hook portion 512 has a first slanting face 514, and each second hook portion 532 has a second slanting face 540 to contact the first slanting face 514, when the push portion 513 abuts against the second slanting faces 540 of the second hook portions 532, the push portion 513 is guided by the second slanting faces 540 to smoothly pass through the two second hook portions 532. Afterwards, when the first slanting face 514 of each first hook portion 512 abuts against the second slanting face 540 of the respective second hook portion 532, a component of force exerted by each first hook portion 512 on the respective second slanting face 540 will push outward each second hook portion 532. This is equivalent to applying a clockwise direction of force (T) against one of the upper engaging hooks 53, and a counterclockwise direction of force (T) against the other upper engaging hook 53. Because the applied forces (T) are greater than upper limit bearing forces of the first and second positioning portions 524, 534, the second positioning portions 534 of each upper engaging hook 53 are forced to disengage from the first positioning portions 524 of the corresponding pair of the fixing plates 52, so that the upper engaging hooks 532 can pivot outward along arrows (III, IV), respectively. It should be noted that the aforesaid upper limit bearing force is determined through the sizes of the first and second positioning portions 524, 534.

Figure 9:
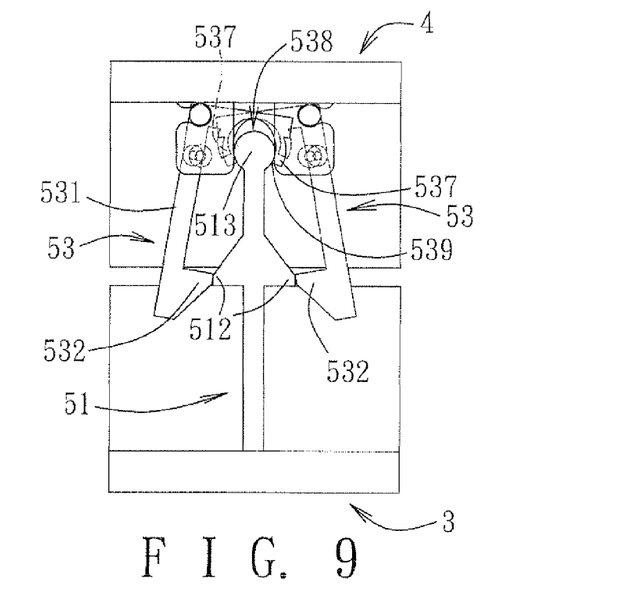
FIG. 9 is a view similar to FIG. 8, but illustrating the push portion pushing against resilient clamp members.
Figure 10:
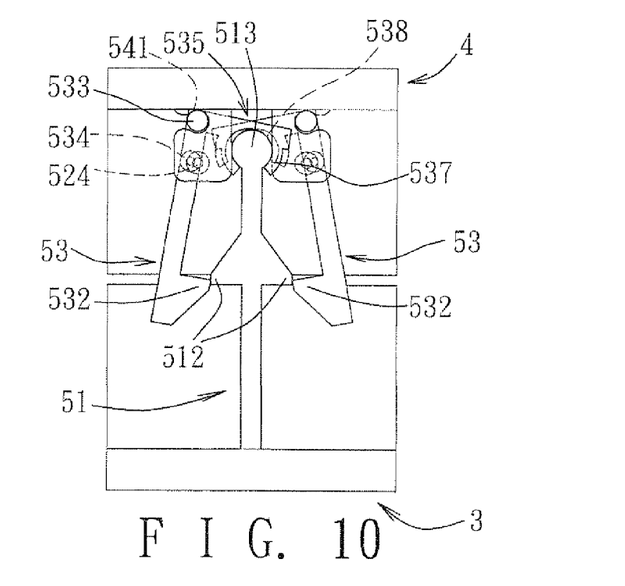
FIG. 10 is a view similar to FIG. 9, but illustrating the push portion entering a clamping groove.
Figure 11:
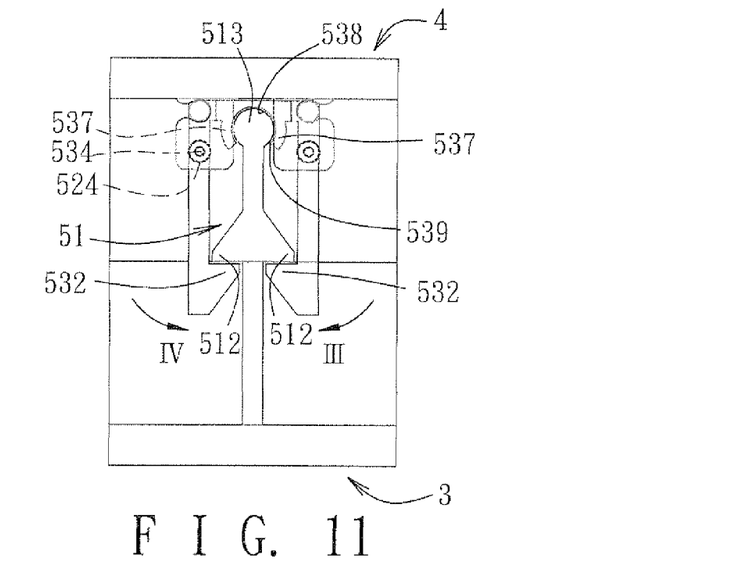
FIG. 11 is a view similar to FIG. 10, but illustrating the push portion being engaged to the clamping groove and the second hook portions engaged to the first hook portions.

With reference to FIGS. 9, 10, and 11, when the outward slanting faces 541 of the upper engaging hooks 53 abut against the second article 4, each upper engaging hook 53 cannot pivot further relative to the corresponding pair of the fixing plates 52. At this time, the second hook portions 532 of the upper engaging hooks 53 are spaced apart from each other at a largest distance to permit extension of the first hook portions 512 therethrough. As such, deformation and breakage of the upper engaging hooks 53 due to pushing by the first hook portions 512 can be prevented. Further, since each upper engaging hook 53 cannot pivot relative to the corresponding pair of the fixing plates 52, the push portion 513 can smoothly push apart the resilient clamp members 537 so that the push portion 513 can engage the clamping grooves 538 of the upper engaging hooks 53 and push upward the second arms 535. At this time, each upper engaging hook 53 is pivotal to move the second hook portion 532 inwardly along the respective arrow (III, IV) to engage the lower engaging face 5121 of the respective first hook portion 512. Through the restoration and retention of the second positioning portions 534 in the first positioning portions 524, the second hook portions 532 can be positioned on the lower engaging faces 5121 of the first hook portions 512. Thus, the fastening device 5 is in a locking position, and the second article 4 is fixed to the first article 3.

Figure 12:
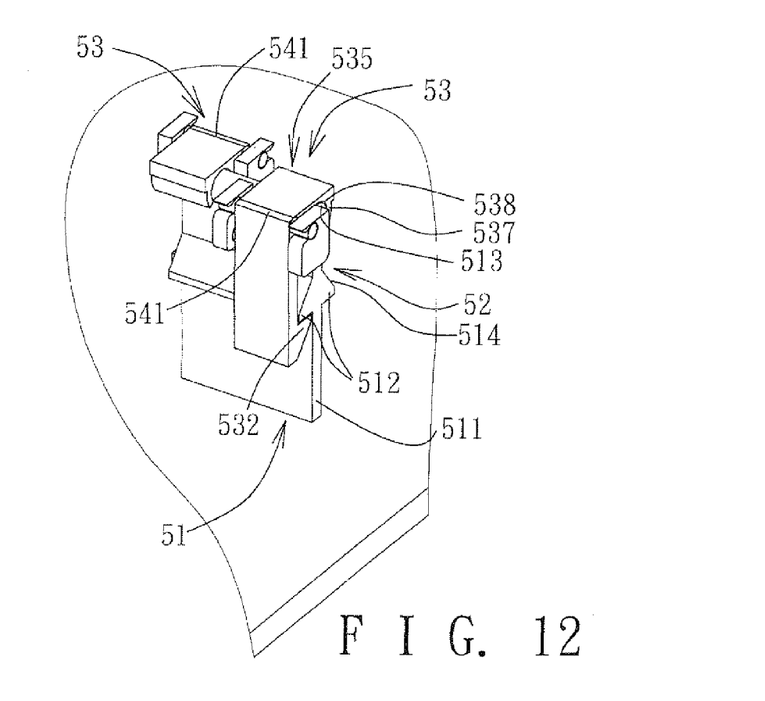
FIG. 12 is a fragmentary perspective view of the embodiment, illustrating the push portion being engaged to the clamping groove and the second hook portions engaged to the first hook portions.

With reference to FIGS. 11 and 12, because the upper engaging hooks 53 are opposite to each other, are spaced apart in a front-rear direction, and are respectively engaged to the lower engaging faces 5121 of the first hook portions 512 of the lower engaging hooks 51, when an external force is applied to the second article 4 leading to the deformation and removal of one of the second hook portions 532 from one of the first hook portions 512, the other second hook portion 532 can will maintain engagement with the other first hook portion 512. Through this configuration, the upper engaging hooks 53 will not be easily detached from the respective lower engaging hooks 51, thereby enhancing the stability of the fastening device 5 in the locking condition.

Figure 13:
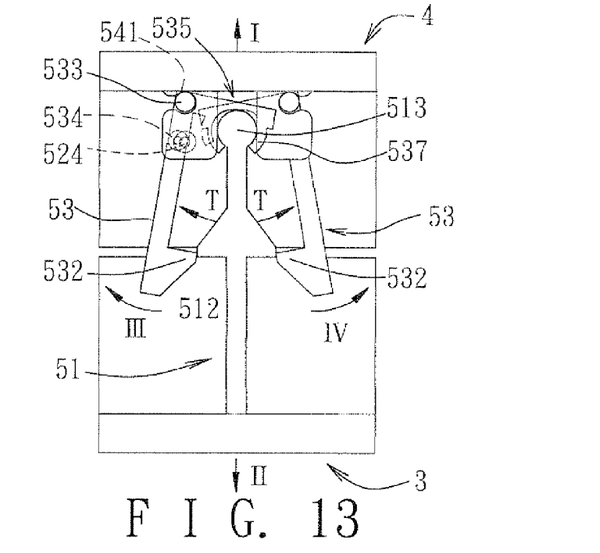
FIG. 13 is a schematic view of the embodiment, illustrating the push portion being pulled out of the clamping groove to separate the first and second articles.
Figure 14:
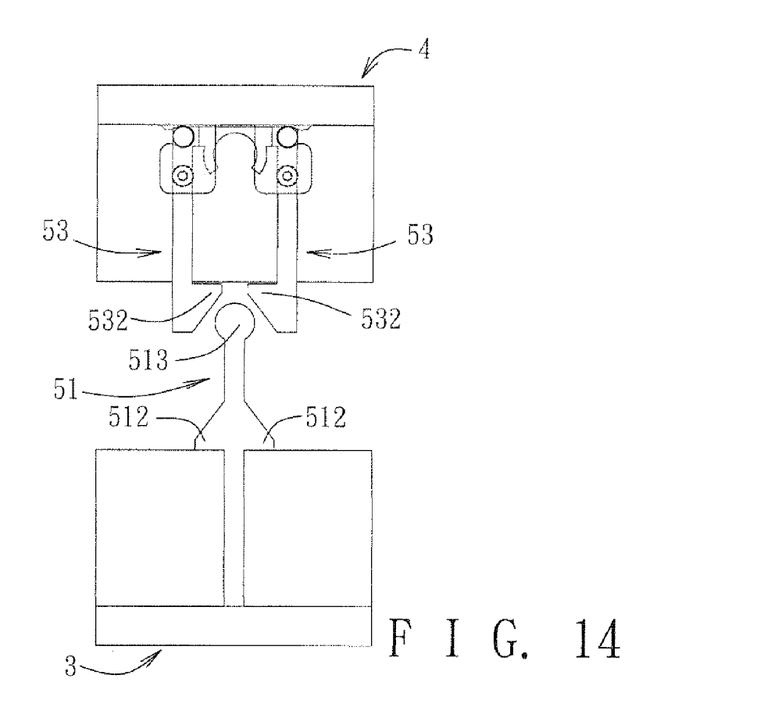
FIG. 14 illustrates the first article being separated from the second article.

With reference to FIGS. 13 and 14, if it is desired to disassemble the second article 4 from the first article 3, the second article 4 is pulled upward along the arrow (II), or the first article 3 is pulled downward along the arrow (I), or the first and second articles 3, 4 are pulled away from each other along the respective arrows (II, I). During the downward movement of the push portion 513, the push portion 513 will simultaneously pull downward the resilient clamp members 537, and will apply clockwise and counterclockwise forces (T) on the respective upper engaging hooks 53. Because the applied forces are greater than the upper limit bearing forces of the first and second positioning portions 524, 534, the second positioning portions 534 of each upper engaging hook 53 are forced to disengage from the first positioning portions 524 of the corresponding pair of the fixing plates 52. When the push portion 513 disengages from the second arm 535, the upper engaging hooks 53 are pivotal to move the second hook portions 532 away from the lower engaging faces 5121 of the first hook portions 512 along the respective arrows (III, IV). When the outer slanting face 541 of each upper engaging hook 53 abuts against the second article 4, each upper engaging hook 53 cannot rotate further relative to the corresponding pair of the fixing plates 52. At this time, the second hook portions 532 of the upper engaging hooks 53 are spaced apart from each other at a largest distance to permit the first hook portions 512 to move easily and smoothly away from the second hook portions 532. Hence, as the push portion 513 moves out of the clamping groove 538 and the first hook portions 512 move away from the second hook portions 532, the fastening device 5 is placed in an unlocking position, and the second article 4 is disassembled from the first article 3. Through engagement of the first and second positioning portions 524, 534, and through the clamping of the push portion 513 by the resilient clamp members 537, a specific value of force must be exerted to release engagement between the first and second positioning portions 524, 534 during disassembly so that the push portion 513 can be removed from the clamping groove 538 to unlock the fastening device 5. Through this configuration, the locking position of the fastening device 5 can be ensured and cannot be easily affected by an external force.

It is worth mentioning that, although two first hook portions 512, four fixing plates 52, and two upper engaging hooks 53 are exemplified, in an alternative embodiment, the number of each of the first hook portion 512 and the upper engaging hook 53 may be one, and the number of the fixing plate 52 may be two. Similarly, the fastening device 5 may be placed between the locking and unlocking positions.

From the aforesaid description, the article assembly 300 of the present invention, through the configuration of the fastening device 5, can quickly assemble and disassemble the first and second articles 3, 4 without using any auxiliary tools, so that use of the present invention can be enhanced. Further, through the upper engaging hooks 53 which can connect pivotally with the pairs of the fixing plates 52, during assembly, the first hook portions 512 can push outward the second hook portions 532 so as to pivot the same and prevent breakage of the upper engaging hooks 53. As the push portion 513 of the lower engaging hook 51 pushes upward the second arms 535 of the upper engaging hooks 53, the upper engaging hooks 53 are pivotal to move the second hook portions 532 to engage the first hook portions 512. Moreover, during disassembly, the push portion 513 will apply a force (T) to each upper engaging hook 53 to remove the second hook portions 532 from engaging the first hook portions 512. Through this configuration, the first hook portions 512 will not be blocked by the second hook portions 532 and can easily move out of the second hook portions 532. Hence, the objects of the present invention can be realized.

While the present invention has been described in connection with what is considered the most practical and embodiment, it is understood that this invention is not limited to the disclosed embodiment but is intended to cover various arrangements included within the spirit and scope of the broadest interpretations and equivalent arrangements.

We claim:

1. A fastening device comprising:
   a lower engaging hook adapted to be provided on a first article and including a push portion, and at least one first hook portion spaced apart from and disposed below said push portion;
   at least one pair of spaced-apart fixing plates adapted to be provided on a second article disposed above the first article; and
   at least one upper engaging hook connected pivotally to and disposed between said fixing plates, and including first and second arms formed as an inverted L-shaped configuration, said first arm extending downwardly from said second arm and having a second hook portion to engage detachably said first hook portion, said second arm being engageable with said push portion, said upper engaging hook being pivotal to move said second hook portion to engage said first hook portion when said push portion engages and pushes upward said second arm, and being pivotal to move said second hook portion away from said first hook portion when said push portion disengages from said second arm; wherein said upper engaging hook further includes two resilient clamp members projecting downwardly from said second arm and cooperatively defining a clamping groove to receive and engage releasably said push portion; and wherein each of said fixing plates includes a pivot groove, said upper engaging hook further including two opposite pivot pins provided at a junction between said first and second arms and journalled respectively to said pivot grooves of said fixing plates.

2. The fastening device of claim 1, wherein said lower engaging hook has an elongate body with top and bottom ends, said top end being used as said push portion, said first hook portion projecting transversely from said elongate body between said top and bottom ends, and having a transversely extending lower engaging face to engage said second hook portion, said first hook portion being tapered upwardly from said lower engaging face.

3. The fastening device of claim 1, wherein each of said clamping groove and said push portion has a round shape in cross section, said clamping groove having a downward opening smaller in width than said push portion.

4. The fastening device of claim 1, wherein said upper engaging hook further includes a corner formed at said junction and having an outer slanting face.

5. The fastening device of claim 1, wherein each of said fixing plates further includes a first positioning portion disposed below said pivot groove, said upper engaging hook further including two second positioning portions disposed respectively on two opposite lateral faces of said second arm below said pivot pins and engaged detachably and respectively to said first positioning portions of said fixing plates.

6. The fastening device of claim 1, wherein said pivot groove has a groove opening facing toward one of said pivot pins.

7. The fastening device of claim 1, wherein two pairs of said fixing plates and two said upper engaging hooks are provided, said upper engaging hooks being connected respectively and pivotally to the pairs of said fixing plates, said inverted L-shaped configurations of said upper engaging hooks lying substantially in different parallel planes, said second arms of said upper engaging hooks extending from respective said first arms in opposite directions, said lower engaging hook including two said first hook portions that project in two opposite directions to engage said second hook portions of said upper engaging hooks, respectively.

8. The fastening device of claim 7, wherein said lower engaging hook has an elongate body with top and bottom ends, said top end being used as said push portion, said first hook portions projecting transversely and oppositely from said elongate body between said top and bottom ends, said first hook portions having lower engaging faces to engage respectively said second hook portions of said upper engaging hooks, said first hook portions being tapered upwardly and toward each other above said lower engaging faces.

9. An article assembly comprising:
   a first article;
   a second article;
   a lower engaging hook provided on said first article and including a push portion, and at least one first hook portion spaced apart from and disposed below said push portion,
   at least one pair of spaced-apart fixing plates provided on said second article which is disposed above said first article, and
   at least one upper engaging hook connected pivotally to and disposed between said fixing plates, and including first and second arms formed as an inverted L-shaped configuration, said first arm extending downwardly from said second arm and having a second hook portion to engage detachably said first hook portion, said second arm being engageable with said push portion, said upper engaging hook being pivotal to move said second hook portion to engage said first hook portion when said push portion engages and pushes upward said second arm, and being pivotal to move said second hook portion away from said first hook portion when said push portion disengages from said second arm; wherein said upper engaging hook further includes two resilient clamp members projecting downwardly from said second arm and cooperatively defining a clamping groove to receive and engage releasably said push portion; and wherein each of said fixing plates includes a pivot groove, said upper engaging hook further including two opposite pivot pins provided at a junction between said first and second arms and journalled respectively to said pivot grooves of said fixing plates, and a corner formed at said junction and having an outer slanting face.

10. The article assembly of claim 9, wherein each of said clamping groove and said push portion has a round shape in cross section, said clamping groove having a downward opening smaller in width than said push portion.

11. The article assembly of claim 9, wherein each of said fixing plates further includes a first positioning portion disposed below said pivot groove, said upper engaging hook further including two second positioning portions disposed respectively on two opposite lateral faces of said second arm below said pivot pins and engaged detachably and respectively to said first positioning portions of said fixing plates.

12. The article assembly of claim 11, wherein said pivot groove has a groove opening facing toward one of said pivot pins.

13. The article assembly of claim 9, wherein two pairs of said fixing plates and two said upper engaging hooks are provided, said upper engaging hooks being connected respectively and pivotally to the pairs of said fixing plates, said inverted L-shaped configurations of said upper engaging hooks lying substantially in different parallel planes, said second arms of said upper engaging hooks extending from respective said first arms in opposite directions, said lower engaging hook including two said first hook portions that project in two opposite directions to engage said second hook portions of said upper engaging hooks, respectively.

* * * * *